United States Patent
Loh et al.

(10) Patent No.: US 11,546,952 B2
(45) Date of Patent: Jan. 3, 2023

(54) WIRELESS SYSTEM FOR LIGHTING AND AUTOMATION

(71) Applicant: Senzo Sdn Bhd (360058-P), Penang (MY)

(72) Inventors: Kuam Hong Loh, Penang (MY); Hong Keng Lim, Penang (MY)

(73) Assignee: SENZO SDN BHD (360058-P), Penang (MY)

( * ) Notice: Subject to any disclaimer, the term of this patent is extended or adjusted under 35 U.S.C. 154(b) by 293 days.

(21) Appl. No.: 17/038,848

(22) Filed: Sep. 30, 2020

(65) Prior Publication Data

US 2021/0204339 A1 Jul. 1, 2021

(51) Int. Cl.
*H04W 76/14* (2018.01)
*H05B 47/19* (2020.01)

(52) U.S. Cl.
CPC .......... *H04W 76/14* (2018.02); *H05B 47/19* (2020.01)

(58) Field of Classification Search
CPC ......... H04W 76/14; H05B 47/19; H04L 67/12
See application file for complete search history.

(56) References Cited

U.S. PATENT DOCUMENTS

| | | | |
|---|---|---|---|
| 2009/0267540 A1* | 10/2009 | Chemel | H05B 47/18 315/297 |
| 2014/0191848 A1* | 7/2014 | Imes | H04B 5/0031 340/10.5 |

\* cited by examiner

*Primary Examiner* — Normin Abedin
(74) *Attorney, Agent, or Firm* — Renner Kenner Greive Bobak Taylor & Weber (57) ABSTRACT

A wireless automation system includes a plurality of devices that forms a hive. Each device includes: a wireless transceiver; having a means to intercommunicate wirelessly with any of the plurality of devices; a microprocessor to process data from at least one input element to generate output for performing actions; a first means for operation without needing to transmit or receive a request, with each device able to operate standalone or connected to at least one third-party device; a second means for initiating a transmission request to other devices, including requests for the other devices to perform an action or a plurality of actions as specified in the transmission request; and a third means for receiving the transmission request from a transmitting device within the plurality of devices and performing at least an action or plurality of actions as requested by the transmitting device.

20 Claims, 6 Drawing Sheets

WIRELESS SYSTEM FOR LIGHTING AND AUTOMATION

FIELD OF THE INVENTION

The present invention relates to a wireless control system for lighting and automation. This invention is based on a multi master, multi worker hive system where all devices that have accepted a pairing request from the initiating device (master) will become workers to this master. Whereas, a master can also accept pairing request initiated from any devices, whether it is a worker or another master, and become a worker to this master. A master can also become a worker, and a worker can also become a master. Thus, creating a hive. A hive consists of at least a group, and a group consists of a master device and at least one worker device.

A master can either request one or a plurality of workers to perform one or a plurality of actions embedded in the request, or to activate the execution of one or a plurality of actions that are already embedded in the worker devices during pairing.

The invention can be used indoors or outdoors. This invention can be used in new buildings or retrofitted into existing buildings, car parks, or outdoor lamp posts, without any need for massive rewiring.

An edge computing device is optional and is not a necessity to be included for said system to operate. If the edge computing device is added, it would be to listen, harvest, store and process all the communication chatters in the hive and if necessary, forward these data remotely to another site for further processing, sharing or storage purposes. The edge computing device can be added later if required.

The hive is able to operate independently on its own without an edge computing device.

BACKGROUND OF THE INVENTION

There are many known lighting and automation systems described in prior art that remotely control lighting and electrical apparatuses using a handheld remote or tablet, in tandem with centralized controller, and either wired, wireless, or via power line carrier communication system. Many of these prior arts systems use a centralized control system and are focused to be expandable with an emphasis on mobility and compatibility. The prior art attempts to provide competent control of increasingly sophisticated functions, including anticipated future functions provided by modern appliances, or anticipating possible customer requirements. In pursuing these goals, many of the prior art systems became complicated and expensive with lots of built in redundancy.

The unnecessary redundancy and complexity make these systems difficult to understand, and thus make the installation of the system very difficult, costly, and hard to maintain. In other words, the prior art inventions, from a business standpoint, are neither practical nor economically viable to customers most of the time.

Besides needing a central control unit, U.S. Pat. No. 6,567,032 to Mullaly et al., U.S. Pat. No. 5,815,086 to Ivie et al. and U.S. Pat. No. 6,297,746 to Nakazawa et al. require a customized receiver control unit to be built-in or retrofitted into every electrical appliance that users want to control. This is neither practical nor economically feasible.

U.S. Pat. No. 5,838,226 to Houggy et al. teaches a centralized automated lighting control system via RF two-way communication protocol with plurality of repeaters. As RF signals are received by every lighting switch in the group, thus, each lighting switch must have a unique device identification number. Similarly, for power line communication system. Thus, with so many IDs, a complex handheld control unit is required to control these lightings.

U.S. Pat. No. 9,113,508 B2 to Wendt et al, U.S. Pat. No. 8,731,690 B2 to Yianni et al, U.S. Pat. No. 7,502,034 B2 Chemel et al, require extraordinary skills, complexity and equipment to setup these systems.

U.S. Pat. No. 8,686,664 B2 Herbst et al, U.S. Pat. No. 8,686,665 B2 Horbst et al are meant for very large regional lighting control that include a network control center.

U.S. Pat. No. 6,979,097 Elam et al teaches modular ambient lighting system providing 3 interchangeable modules so that any lamp can be easily configured to different form of illumination. What is lacking here is that clients will still have to change their existing lighting fixture to this specific fixture to benefit, retrofitting to clients' existing light fixture will be troublesome.

U.S. Pat. No. 10,322,376A1 to Peter Francis Couse teaches a blue tooth pairing that is quite convoluted wherein requiring pairing information against a user profile, logging into a user personal device by entering an extension number or username and password, initiating a pairing process and selecting from a displayed list of available wireless devices that is within range to the personal use device, and entering a passcode of said wireless device on said personal use device, after which the unique identifier and the passcode is then stored into a database as pairing information stored against a user profile to complete the pairing sequence.

Similarly, complexity is also seen in the teachings of U.S. Pat. No. 8,340,007B2 Lu et al whose pairing method needs information such as MAC (Media Access Control) address, PMN (Pairing Magic Numbers) and pairing indices to be exchanged between devices, not to mention register mode, enrollee mode and frame exchanging such as join pairing frame, wait pairing frame, pairing accept frame for any pairing or unpairing to be successful.

Also seen in the teachings of U.S. Pat. No. 9,420,446 B2 Brown et al is a complex hive network prompting plurality of users to register with a capabilities aware hive network, said plurality of users providing information of their individual capabilities, compiling all said individual capabilities from said plurality of users, obtaining data on the occurrence of an event and identifying and prioritizing individual capabilities to response to said event and user-providing specific instructions to the plurality of users to perform individual user actions on how to response to said event.

What the prior art fails to consider for lighting control and automation is simplicity. Easy to install by retrofitting and easy to configure. In the prior art described above, it is not economically feasible to do lighting control and automation at a small scale, nor do they provide the flexibility to upsize it later without spending a fortune upfront.

SUMMARY OF THE INVENTION

The above convoluted pairing and hive network systems and methods can be simplified and networks can be provided to pair with unlimited number of devices (restricted only by the size of the storage memory) and to do cross pairing, reverse pairing, and unpairing while needing only a list of unique Device Identification Number (DIN) that worker devices had accepted as masters. A hive consists of many groups and each group has its own worker devices (i.e. capabilities). As it is a multi masters and multi workers hive where a worker device can also become a master and where a master device can also become a worker device, thus a device can become worker device to multiple masters and a master device can also become a worker device to other masters. In short, a hive can have multiple groups, and group members can and are allow to overlap with any other groups. It is this flexibility that makes a hive simple, efficient, and easy to create.

In some embodiments, there are only 2 rules. As a first rule, a device that initiates a pairing request becomes a master, and devices that accept said pairing request become workers. As a second rule, a device—whether it is a yet unpaired device, an already paired device as master, or an already paired device as worker—can refer back to rule 1 either to initiate a pairing to become a master or accept a pairing request and become a worker. This can be practiced again and again, unlimited times.

The inadequacies of the inventions disclosed by prior arts are evident. Accordingly, one object of the invention is to overcome the drawbacks mentioned above.

Therefore, a primary object of the present invention is to overcome the inadequacies of the prior art without compromising on the ease of use, flexibility and functionality. Specifically, it is an object of the present invention to enable the commissioning of the invention using only the buttons and indicators on the invention itself without the need of computers or mobile devices at the site of installation.

A further object of the invention is to make it easy to retrofit into existing homes or buildings without massive rewiring A further object of the invention is to provide control of the power from electrical switches to the connected third party electrical or electronic devices.

Besides electrical power control, a further object of the invention is to make this invention logical in its decision making, depending on the input of the sensors.

In tandem with the sensor input, a further object of the invention is that parameters like time duration, dimming level, direction etc. . . . can be selected and utilized for different applications.

A further object of the invention is that different kind of sensors can be interchanged into the invention for different applications.

A further object is to connect the invention to third party devices that users want to automate.

A further object of the invention is to enable this invention to work singularly A further object of the invention enable this invention to work in group or groups. Unlike mechanical switches that acts singularly, a further object of the invention is to enable easy pairing of the invention with each other to work in groups.

A further object of the invention is that all devices of the same group are assigned group identification number and frequency channel that allows it to receive and to respond to any broadcast from any unit that belongs to the same group. In order to be modular and independent, every device of the same group has a copy of this information. No registration is necessary with any centralized devices. Centralized control panel, computer or mobile devices are optional.

A further object of the invention is to provide a secure yet simple method to setup all units. Upon installation on site with electrical wiring connected and electrical power turned ON, the unit that initiates the pairing (hereinafter known as a Ping) becomes the master and all other units that accept the pairing request (Ping) become the workers.

'Ping' is a radio frequency transmission that requests all devices of the invention with the same factory assigned group identification number and same frequency channel to identify itself by either sounding its buzzer or flashing its light emitting diodes (hereinafter refer to as LED) or both.

By pressing and holding down the pairing button longer than 1 sec (hereinafter known as a 'long press') will initiate a 'Ping' broadcast, making this device a master.

Once other devices of the same group with the same frequency channel heard the Ping request, they will start beeping or flashing its LED or both. To accept the 'Ping' request, user presses the pair button on each devices the user wants to pair with the master. The beeping or LED flashing will stop, and the device is now a worker, or one of the workers to the device that initiates the pairing (Master). Each master can have unlimited workers.

The 'Ping' request can be done repeatedly by any units to any other units that belong to the same group. Specifically, a further object of the invention is that a worker unit can also become a master by initiating a pairing request and other units that accept the pairing request (even if it is already a master) will become workers. Thus creating a multi master multi worker environment. In short, a hive.

More specifically, as more units of this invention are deployed at a particular site, this invention creates a hive environment where units regularly communicate and execute request from each other. Request can be as simple as repeating an instruction so to widen the coverage of the hive. Or dim a light. Or open a door. Or turn on a water sprinkler. Or tell a motorized CCTV to view a certain direction. Or send a notification to any devices outside of the hive, if internet are connected to the invention. Or the invention can simply be connected to a repository or an edge computing device where all instructions, time, device name, location are log and kept—for big data analytics at a later date.

Further objects and advantages of the present invention will become apparent with the detailed description of the drawings and the preferred embodiment of the invention An embodiment of the present invention provides a wireless automation system comprising a wireless transceiver; said wireless transceiver also include means to intercommunicate wirelessly with any device of this invention within a hive in said system; a microprocessor operably processing data from at least one input element for decision making to generate output for relevant actions; first means for a device to operate singularly without transmitting or receiving any request whether said device is standalone or connected or interpose to any third party devices; second means for a device of this invention to initiate transmission request to other devices of this invention requesting said other devices to perform an action or a plurality of actions as specified in said transmitted request; and third means to received request from one of said transmitting devices of this invention and performing at least an action or plurality of actions as requested by said transmitting device.

Another embodiment of the present invention provides a wireless automation system as in any embodiment above, wherein said received request from one of said transmitting devices of this invention also include means to forward this said request to one other device or plurality of other devices of said invention.

Another embodiment of the present invention provides a wireless automation system as in any embodiment above, wherein to inter-communicate also include means of using a common Hive Identification Number (HIN) and Frequency Channel (FC) for a plurality of devices of said inventions to inter-communicate within a hive in said system.

Another embodiment of the present invention provides a wireless automation system as in any embodiment above, wherein the wireless automation system further comprises further include a button or a plurality of buttons, wherein manipulating said button or buttons also further comprise: means to pair devices of said invention to at least a device in said hive; means to turn On or to turn Off third party devices connected to said device; and means to set timer for said devices in its control of third party devices connected to said device.

Another embodiment of the present invention provides a wireless automation system as in any embodiment above, wherein said buttons comprise of a Pair button and an On/Off toggle Button.

Another embodiment of the present invention provides a wireless automation system as in any embodiment above, wherein said buttons if pressed simultaneously (long press) will clear the master Device Identification Number (DIN) list and unpair all pairings in the said device.

Another embodiment of the present invention provides a wireless automation system as in any embodiment above, wherein said device that initiate a pairing request will become a master.

Another embodiment of the present invention provides a wireless automation system as in any embodiment above, wherein said device or plurality of said devices that accept said pairing request will become a worker.

Another embodiment of the present invention provides a wireless automation system as in any embodiment above, wherein device of said invention also include means to pair multiple times and be a master to many workers and be a worker to many masters.

Another embodiment of the present invention provides a wireless automation system as in any embodiment above, wherein such multiple times pairing is only limited by memory storage within said device that is use to keep pairing information.

Another embodiment of the present invention provides a wireless automation system as in any embodiment above, wherein the wireless automation system further includes a selectable Auto Reverse Pairing Mode (ARPM) wherein after a master has successfully paired with a worker, said worker will reciprocate and reverse pair with said master, and said auto reverse pairing make said master into a worker and said worker into a master.

Another embodiment of the present invention provides a wireless automation system as in any embodiment above, wherein said selectable ARPM further comprises: first means for said device to enter pairing mode by long pressing button; second means to read the status of ARPM wherein a blinking LED indicates ARPM is disabled, wherein a LED that is on without blinking indicates ARPM is enable; third means to enable ARPM by doing a long press on button until LED is turned On and stop blinking; fourth means to disable ARPM by doing a long press on button until LED starts blinking; and fifth means to save ARPM status by pressing pairing button to get out of pairing mode and save the last state of ARPM into said device.

Another embodiment of the present invention provides a wireless automation system as in any embodiment above, wherein the wireless automation system further comprises means of at least a sensor collecting real time information of its surrounding, and said collected information is configured by said microprocessor for decision making.

Another embodiment of the present invention provides a wireless automation system as in any embodiment above, wherein the wireless automation system further comprises a display for configuring said invention by manipulating said buttons.

Another embodiment of the present invention provides a wireless automation system as in any embodiment above, wherein the wireless automation system further comprises a real time clock and a backup battery for said invention to plan and carry out actions by time scheduling.

Another embodiment of the present invention provides a wireless automation system as in any embodiment above, wherein the wireless automation system further comprises a CPU control switching that can select between Alternate Current (AC) or Direct Current (DC) to output to L1 for power output control or Boolean selection of third party devices.

Another embodiment of the present invention provides a wireless automation system as in any embodiment above, wherein the wireless automation system further comprises means to use said switch control AC power output of L1 for power management control of third party device that is interposed with said system to turn On or to turn OFF or a combination of both with time interposed in between said On and said Off sequence; means to use said switch control DC power output of L1 for power management control of third party devices that is interposed with said system to turn On or to turn OFF or a combination of both with time interposed in between said On and said Off sequence; means to use said switch control DC power output of L1 as boolean logic of '0' or '1' to enable selection of third party devices that is interposed with said invention.

Another embodiment of the present invention provides a wireless automation system as in any embodiment above, wherein the wireless automation system further comprises a communication port to share data and control of third party devices that are connected or interposed with said invention.

Another embodiment of the present invention provides a wireless automation system as in any embodiment above, wherein said invention when acting as a master can control by proxy its workers and allow a master to request its workers to take prescribed action on its behalf.

Another embodiment of the present invention provides a wireless automation system as in any embodiment above, wherein the system according to claim 19 wherein said proxy worker acting on behalf as proxy to said requesting master comprises: means to transmit instructions to said proxy workers for execution; means to transmit authorization to execute instructions embedded in said proxy workers memory; means to transmit authorization to abort execution of instructions in progress by said proxy workers; and means to transmit information collected by said proxy workers to said master.

An embodiment of the present invention provides an edge computing device wherein the edge computing device can be a computer or a mobile device that is equipped with a radio frequency transceiver, with same Hive Identification Number (HIN) and same Frequency Channel (FC) to inter-communicate with one or a plurality of devices within said hive.

Another embodiment of the present invention provides an edge computing device as in any embodiment above, wherein said edge computing device further comprises: processing capabilities; means to listen and to harvest all communication chatters within a hive; means to process said harvested chatters into meaningful analytical data; means to store into a memory storage said raw chatters and analytical data; and means to utilize said raw chatters and analytical data for operations and decision making purposes.

Another embodiment of the present invention provides an edge computing device as in any embodiment above, wherein the edge computing device further comprises operation capabilities means for said edge computing device to become a super user to control, pair, unpair, intercept, execute, cancel, repeat, broadcast, reconfigure; and means to issue instructions to one or a plurality of devices of said invention.

Another embodiment of the present invention provides an edge computing device as in any embodiment above, wherein using said edge computing device to do mass pairing comprises means to do pairing using a 3 dimensional coordinate of X, Y and Z referring to location information that reference to a predefined location of 0,0,0; and means for a fourth coordinate that reference to a group number.

Another embodiment of the present invention provides an edge computing device as in any embodiment above, wherein the edge computing device further comprises remote connectivity capabilities including: means to connect to remote computing devices that are not part of said hive; and means to forward these data remotely to another site for further processing, sharing or storage purposes.

Another embodiment of the present invention provides an edge computing device as in any embodiment above, wherein said edge computing devices is optional and not a necessity to be included for said system in claim 1 to operate.

An embodiment of the present invention provides a method for hive communication comprising: using common Hive Identification Number (HIN) and Frequency Channel (FC) for intercommunicating within said hive; providing each device a Device Identification Number (DIN); pairing of said devices wherein any device in said hive that initiates pairing become master and devices in said hive that accepted said pairing request become workers; and providing any device in said hive can initiate pairing multiple times and be a master to many workers and can also accept multiple pairing request to be a worker to many masters.

Another embodiment of the present invention provides a method for hive communication as in any embodiment above, wherein also include means for a said worker device to store a list of devices Device Identification Numbers (DIN) that said worker device had accepted as master during a pairing request, and operable to carry out an action or plurality of actions as instructed in said received request if said DIN in said received request is listed in said DIN list.

Another embodiment of the present invention provides a method for hive communication as in any embodiment above, wherein any device can receive request from said master device in said group and to forward said request to other devices within said hive.

Another embodiment of the present invention provides a method for hive communication as in any embodiment above, wherein a hive can have multiple groups wherein each group has a master device and at least one worker device, where said worker device or plurality of worker devices include means to couple to any other groups within said hive, either as master of another group or as worker to another master in another group.

DETAILED DESCRIPTION OF ILLUSTRATIVE EMBODIMENTS

With references to the drawings that form a part hereof, in which the preferred embodiment of the present invention may be practiced, it is understood that other embodiments may be utilized as structural changes may be made without departing from the scope of the present invention.

For simplicity purposes, the current description of the preferred embodiment uses lights to explain the pairing concept of the invention. This invention can also be used to control other third party devices besides lighting, such as security devices, electrical appliances and various types of sensors that can be used in the present invention for different applications. The following descriptions of embodiments are not exhaustive.

Referring to the drawings, all this will become clear as the preferred combinations of embodiments are explained in detail.

Figure 1:
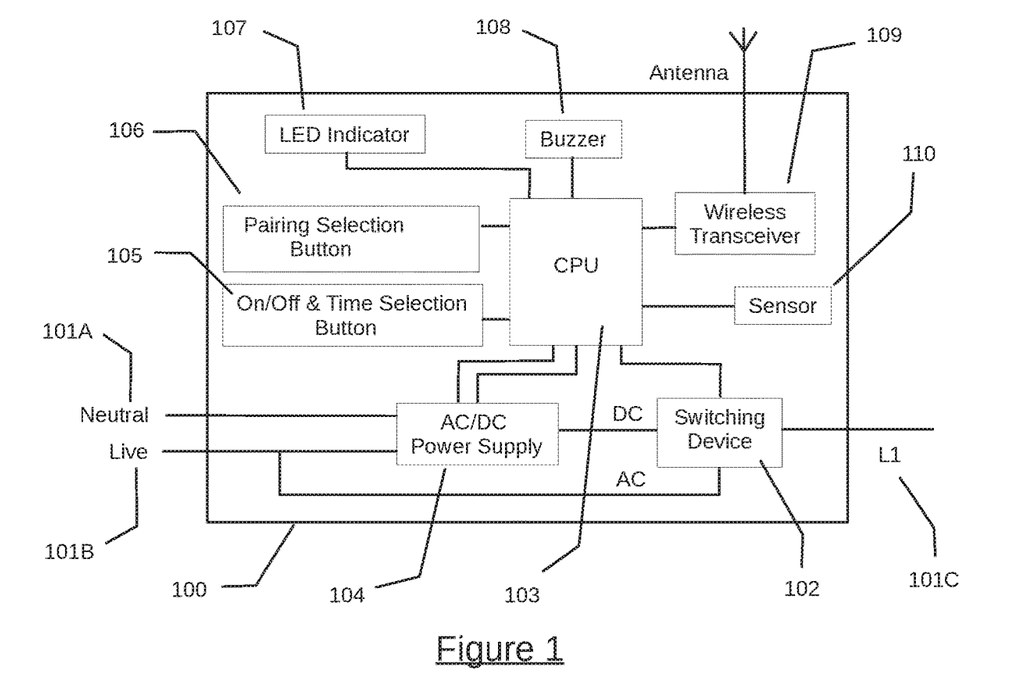
FIG. 1 shows a block diagram of the present invention of a modular wireless automated switching system

FIG. 1 is one embodiment of a block diagram of the present invention showing a microprocessor control wireless automated switching device. 101A is Neutral and 101B is the Live wire from Alternate Current (AC) supply that is available in all houses and buildings. 104 is the Alternate Current (AC) to Direct Current (DC) converter that converts AC supply to DC supply to provide power to all the electronics of this invention, and also be connected thru to 101C. 101C is L1, which is the electronically control version of 101B incoming Live wire or DC output from 104. 101C (L1) is controlled by 103 the Central Processing Unit (CPU). Depending on the 110 sensor status or the instructions from the master unit, 103 CPU will decide whether to select 102 switching device to let either 101B (AC Live) or DC power from 104 to connect thru to 101C (L1). 105 is a dual purpose manual toggle button. Its first function is as an On and Off toggle button. After 103 CPU has decided to either pass thru 101B (AC live) or DC power from 104, user can still use 105 to manually turn On (107 LED On) or turn Off (107 LED Off) power to third party device. This is a safety feature.

A long press on 105 On/Off toggle button brings out its second function as time selection button. 106 is the pairing button. Both 105 and 106 buttons are user input to 103 CPU. Both buttons respond to both short press and long press. A long press is when a button is pressed and held down for more than 1 second before letting go. A short press is when a button is pressed and the held down time is less than 0.5 second. In other words, the button is pressed down and then quickly let go.

For time selection, there are many possible embodiments. This is one possible embodiment. To start timer setting mode for the invention, user have to press 105 timer button with a long press, 108 buzzer will beep a sound, and 107 LED will light up. Indicating to user that the 103 CPU is ready to accept time setting from user. User now can set the time for the On/Off duration of 101C (L1).

A short press represents 1-minute per press, and will have a short beep on the buzzer 108.

A long press represents 10-minutes per press and will have a long beep on buzzer 108.

For simplicity in disclosing the usage of the timer and practical purposes of application, this embodiment allows 9 short presses and 10 long presses—that gives it a maximum of a 99-minute timer with 1-minute resolution.

Other resolutions and time durations are possible. Another possible setting could be 10-minutes for a short press and 1-hour for a long press. This will give user a 10-minute resolution. Factory default timer setting is 1-minute. Resolution is 1 minute for short press and 10-minutes for long press.

Once the timer setting is completed, press 106 pairing button to end timer mode. When timer mode ended, the buzzer will play back the timer setting. A series of short beep and a series of long beep will be played back to the user. The user can count the short beeps and the long beeps to reconfirm the timer setting.

User can start the pairing process by doing a long press on 106 pairing button. Once the pairing mode is enabled, the device that initiates the pairing request automatically becomes a Master, and 109 radio transceiver will broadcast the pairing request to a plurality of devices that have the same assigned Hive Identification Number (HIN) and same Frequency Channel (FC). Devices that are already paired with this master will have their 107 LED light up. Devices that are not paired with this Master, their 107 LED will blink. To accept pairing from this master, user just has to do a short press on the 106 pairing button and it will accept the pairing request and become a worker to this master. The 107 LED will stop blinking and turn ON until the master pairing request is auto turned OFF after a certain duration, approximately 2 minutes, or until the user has manually turned OFF the pairing request by pressing the master's 106 pairing button. For a worker that has already paired with this Master, it can un-pair by pressing its 106 pair button. The previously lit up LED 107 will now start blinking to indicate that it's no longer paired to this master.

110 sensor can be any type of sensor such as a motion sensor, ambient sensor, gas sensor, magnetic sensor, vibration sensor etc. Different sensors are used for different applications. The sensor output connected to 103 CPU will decide whether to turn ON or to turn OFF 102 switching device to let 101B connect thru to 101C (L1).

Figure 2:
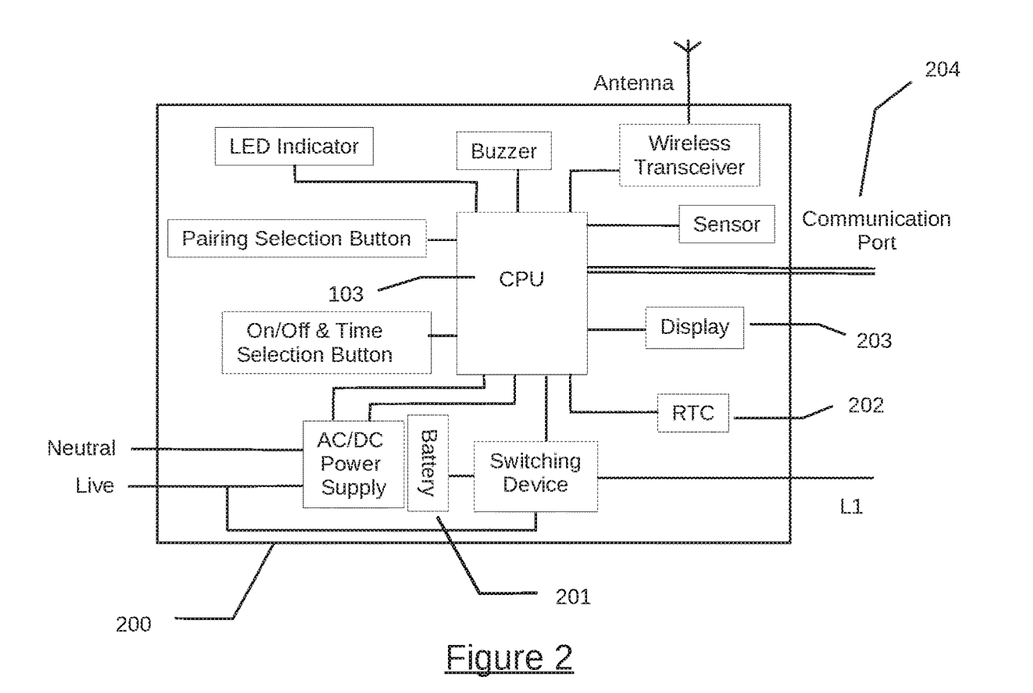
FIG. 2 shows an enhanced block diagram of the present invention of the modular wireless control system with the enhancements of a backup battery, real time clock, a display and a communication port.

FIG. 2 shows another possible embodiment of the invention 200 with enhanced electronics. In the event of a power failure, 201 is a battery that helps to keep the invention functional, the sensor can continue to collect data, and also keep the 202 RTC (Real Time Clock) ticking. 203 is a display that can be used to set the RTC or any other settings that are required. In this enhanced version with a 203 display, 105 On/Off toggle button and 106 pairing button can now be used to navigate the display, thus providing more flexibility and functionality to the invention. In a hive, only one or a few units (with these enhanced capabilities) are required.

204 is used for communication with any external devices that are connected to this invention. 204 can be any form of communication interface. In this embodiment, 204 is a USB port. There are other possibilities and thus, this 204 embodiment is only one of the possibilities and not exhaustive. Depending on the extent and complexity of how a user wanted to control their third party appliances, said appliance can connect to 101C only, to 204 only, or both to 101C and to 204.

Third party device that connects to 101C only will enable user to control the power to said connected device.

Third party device that connects to 204 only will enable user to have finer control to said connected device.

Third party device that connects to both 101C and 204 will enable user to control power to said device and also transmit instructions and exchange data to said connected devices. USB port inherently is multi-purpose. Thus 204 USB is basically a plug and play expansion port that can be connected with many third party devices and be functional in a jiffy. For example, data storage, Bluetooth or even WiFi can be connected to 204.

Figure 3:
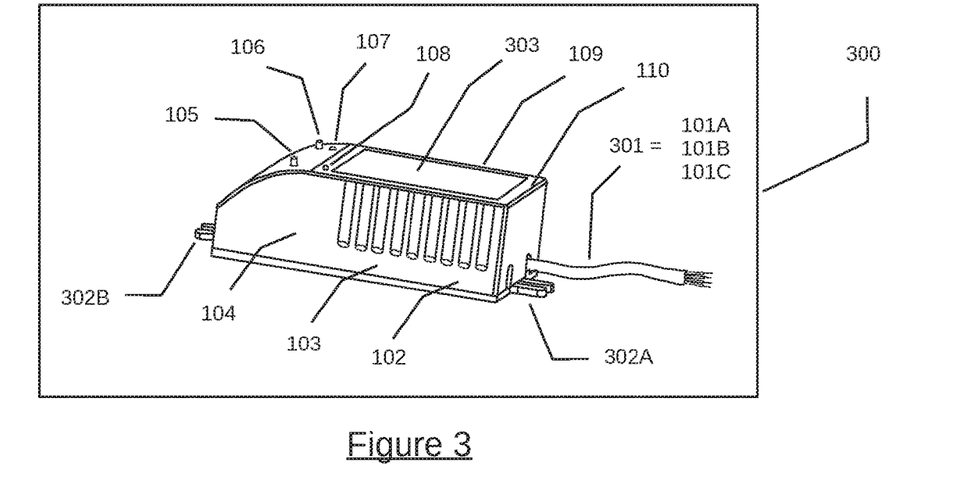
FIG. 3 shows a physical outlook of the present invention.

FIG. 3. is one embodiment of the invention, where 300 represents the invention in its physical form. 301 is a 3 core cable representing 101A (Neutral), 101B (Live) and 101C (L1). 302A and 302B are C shape screw holder for screws to attach the invention to the wall or ceiling. 303 is a rectangular section of the top housing that is earmark for opening. Once this piece of plastic is removed, a 203 display can be sited in this location.

Figure 4:
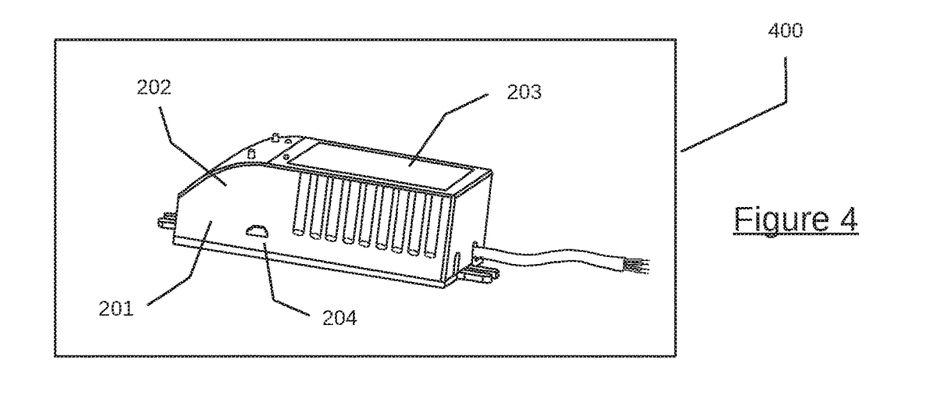
FIG. 4 shows a physical outlook of the enhanced version of the present invention.

FIG. 4. shows 400 which represents the enhanced version of this invention in its physical form. 201 is where the backup battery is situated inside the casing. 202 is where the Real Time Clock (RTC) is situated inside the casing. 203 is an LCD display—after 303 rectangular plastic is removed to provide a window for 203. 204 is a communication port. In this embodiment it is a micro USB port. Other types of ports are also possible.

Figure 5:
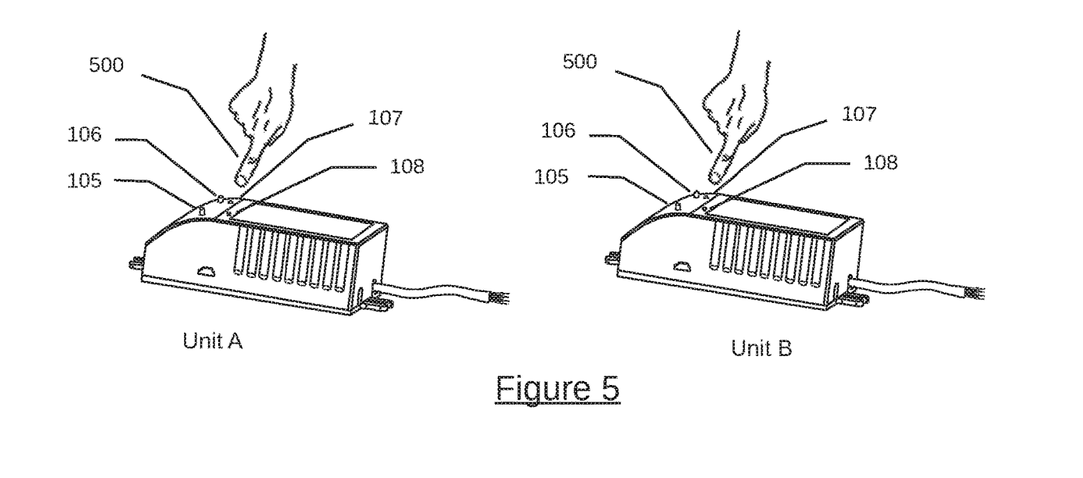
FIG. 5 shows how to initiate configuration mode of the present invention, before installation, for pairing and time selection by a hand with an index finger pressing the buttons on the invention.

FIG. 5. shows an embodiment of how a user performs a pre-installation pairing and setting for 2 units of the invention—with 500 an index finger to manipulate 105 (time setting button) and 106 (pairing button).

Figure 6:
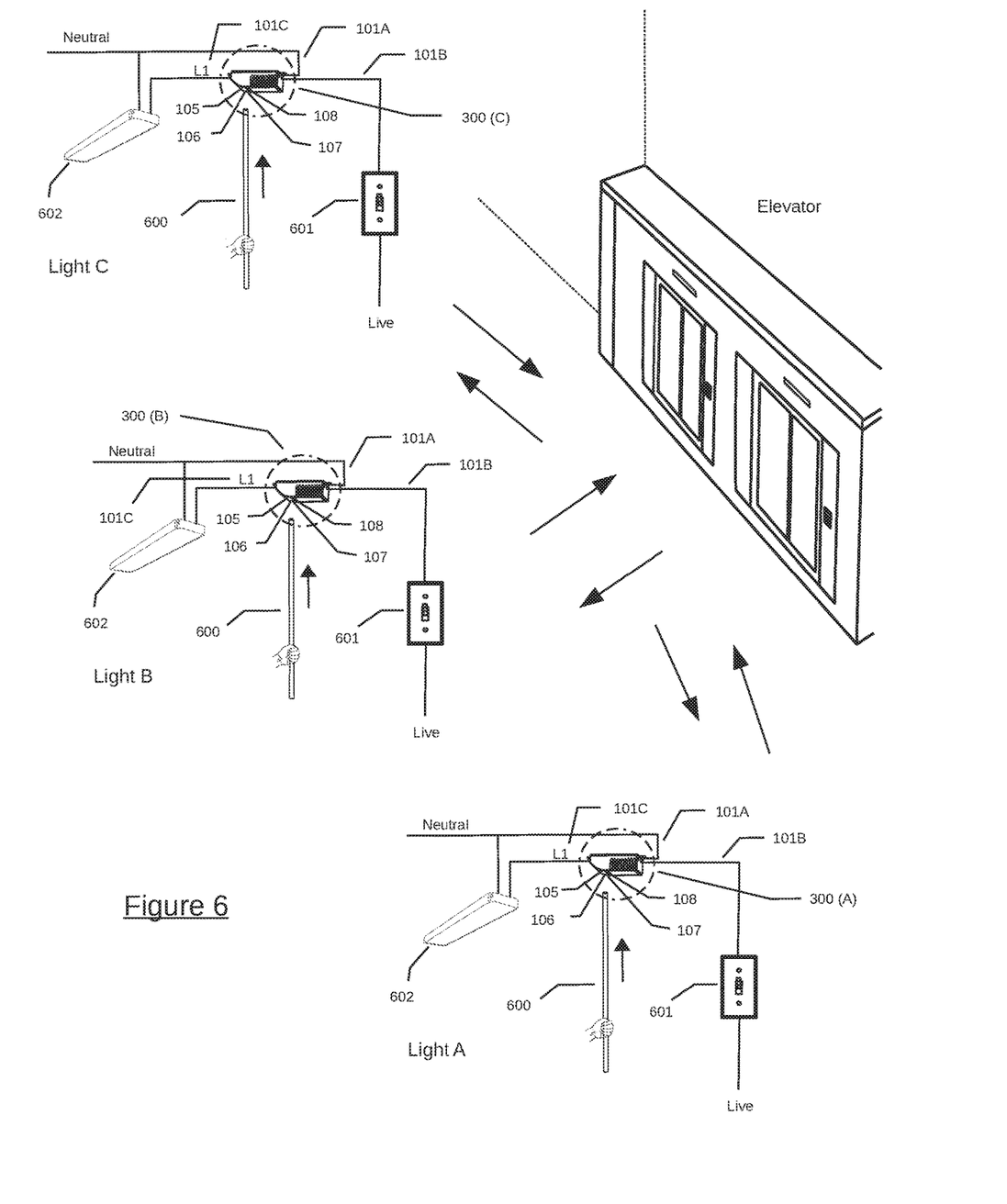
FIG. 6 shows how to initiate configuration mode of the present invention after installation, by using a handheld pole, for pairing and time selection for lighting from different circuits in an elevator area without the need of ladder or tools or computer or mobile devices.

FIG. 6 shows an embodiment of how a user performs the setting on the present invention to pair lights and time selection, for a plurality of lights from different circuits. With this installation, lights of different circuits can be controlled as if they are of the same circuit. In other words, these lightings now belong to the same hive even though they are physically of different circuits. Referring to Light A, Light B and Light C, 600 a handheld pole shows a simple way to configure 300 the present invention without the need of a ladder or any computer. 600 a handheld pole can also be used to initiate pairing request and to accept pairing request. 601 is the power switch and is put in the ON position at all times. User can turn 601 power switch OFF if he wants to do some servicing or change the lights 602. Similarly, there is no necessity to change the lights 602, besides installing 300 the present invention besides it.

FIG. 6 also shows an example of light pairing in front of the elevator to both the lights on the left and on the right of the elevator. This shows a practical application on how to pair lightings in and around elevator areas to cater to the movements of people.

Light B is in front of the elevators. Walking out of the elevator, light C is on the right of the elevator and light A is on the left of the elevator.

The six arrows show six possibilities of people movement in the vicinity of the elevators. Based on these 6 movements of people as shown, the following pairing strategy would be logical. The first pairing is for people coming out of the elevator:

When the sensor of 300 (Light B) detects the door of the elevator opening, Light B itself will turn ON, and it will also instruct light A and light C to turn ON. A person coming out of this elevator, will have the lights in front of the elevator turned ON, and both lights on his left and on his right are also turned ON. Thus, preparing the pathway for his next movement to wherever he wants to go.

The first pairing of the invention will be as follow:
1) 300 (Light B) initiates the pairing.
   Long press Pair button and let go. LED On
2) Both 300 (Light A) and 300 (Light C) will accept pairing request from to 300 (Light B).
   300 (Light A) LED Blinking, short press Pair button to accept pairing request.
   300 (Light B) LED Blinking, short press Pair button to accept pairing request.
3) 300 (Light B) LED On—short press Pair button and let go. LED Off. Pairing complete
   Now 300 (Light B) is the master to 300 (Light A) and 300 (Light C).
   Both 300 (Light A) and 300 (Light C) are now workers to 300 (Light B).

The second pairing is for people going towards the elevator, from the direction of Light A towards Light B:
When the sensor of 300 (Light A) detects people walking towards it, Light A itself will turn ON, and it will also instruct light B to turn ON. Thus, preparing the pathway for this person going towards the elevator.
1) 300 (Light A) initiates the pairing
   Long press Pair button and let go. LED On
2) 300 (Light B) accepts pairing request from 300 (Light A).
   LED Blinking, short press Pair button to accept pairing request.
3) 300 (Light A) LED On—short press Pair button and let go. LED Off. Pairing complete
   Now 300 (Light A) is the master to 300 (Light B)
   300 (Light B) is now worker to 300 (Light A).

The third and final pairing will be for people going towards the elevator, from the direction of Light C towards Light B:
When the sensor of 300 (Light C) detects people walking towards it, Light C itself will turn ON, and it will also instruct light B to turn ON. Thus, preparing the pathway for this person going towards the elevator.
1) 300 (Light C) initiates the pairing
   Long press Pair button and let go. LED On
2) 300 (Light B) accepts pairing request from 300 (Light C).
   LED Blinking, short press Pair button to accept pairing request. LED On 3) 300 (Light C) LED On—short press Pair button and let go. LED Off. Pairing complete
   Now 300 (Light C) is the master to 300 (Light B)
   300 (Light B) is now worker to 300 (Light C).

The 3 steps shown above that are required to pair all 3 lights of A, B and C in front of the elevators can be optimized by using Auto Reverse Pairing Mode (ARPM). When ARPM is enabled, after a master successfully paired with a worker, the worker will reciprocate and do a reverse pairing with the master, thus making the master into a worker and the worker into a master.

In short, when Light B initiates pairing with Light A and Light C, after successfully accepting the pairing request from Light B, Light A will auto initiate a pairing to Light B, and similarly Light C will also auto initiate a pairing to Light B. Light B will auto pair as workers to Light A and Light C. Thus now:

Step 1: Light A (worker) & Light C (worker)→ are paired to Light B (Light B is master)
Light A (worker) LED blinking, short press own pair button once to accept pairing request. LED On→ then follow by Light B (become worker) auto reverse pairing to Light A (Light A now is master)
Light C (worker) LED blinking, short press own pair button once to accept pairing request. LED On→ then follow by Light B (become worker) auto reverse pairing to Light C (Light C now is master)

The practical usage of ARPM has reduced a 3 step pairing process to one that is now done in 1 step. The teaching of an embodiment of a multi masters, multi workers pairing (hive) with a practical real life application have just been disclosed above.

Figure 7:
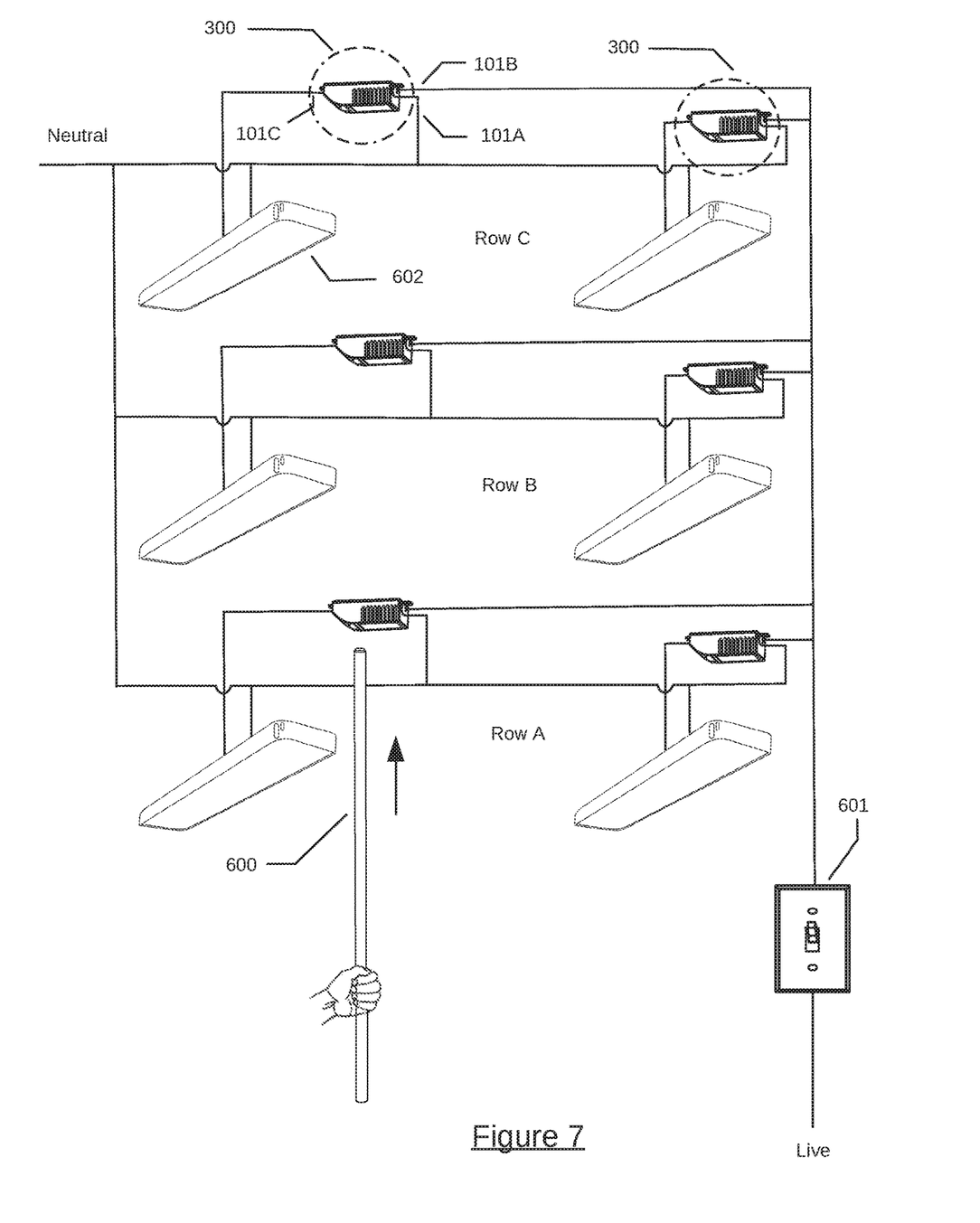
FIG. 7 shows how to initiate configuration mode of the present invention, by using a handheld pole after installation for pairing lights and time selection for individual lighting from the same circuits in an office area without the need of ladder or tools or computer or mobile devices.

FIG. 7 show an installation of the inventions as an automated smart lighting system at an office, for individual lighting of the same circuit in an office area. As the invention is installed on each light, thus all these lights can be controlled independently even though all of them are connected to the same circuit.

A logical way to control these lights are:
1) single non pairing—independent, sensor will ON its own light when it senses movement
2) adjacent pairing method or
3) adjacent pairing method with layers (depth)

single non pairing is used to turn ON own light where motion is detected.
adjacent pairing is used for turning ON lights that are at the location (A) where motion is detected, and in tandem, turning ON all the lights beside it (all the lights indicated as B)

| B | B   | B |
|---|-----|---|
| B | (A) | B |
| B | B   | B | adjacent pairing with layers is used for turning ON lights that are at the location (A) where motion is detected, and in tandem turning ON all the lights beside it (location B) and the lights next to the adjacent light (location C). This describes a 2-layer adjacent pairing

| C | C | C   | C | C |
|---|---|-----|---|---|
| C | B | B   | B | C |
| C | B | (A) | B | C |
| C | B | B   | B | C |
| C | C | C   | C | C |

Another embodiment of pairing with layers is shown below

| C1 | C2 | C3 | C4 | C5 |
|----|----|------|----|----|
| B1 | B2 | B3 | B4 | B5 |
| A1 | A2 | (A3) | A4 | A5 |

A person walking towards A3—in other words when A3 detects a person walking towards it, it will turn ON all the lights on row A, and row B and row C Description of the embodiment at the elevator areas in FIG. 6 shows a form of progressive pairing, that means the controlling of turning ON the lights will be one step ahead, predicting the direction of the movements detected.

Many types of pairing are possible. The descriptions of some of these pairings are for disclosure purposes and not meant to be exhaustive.

Figure 8:
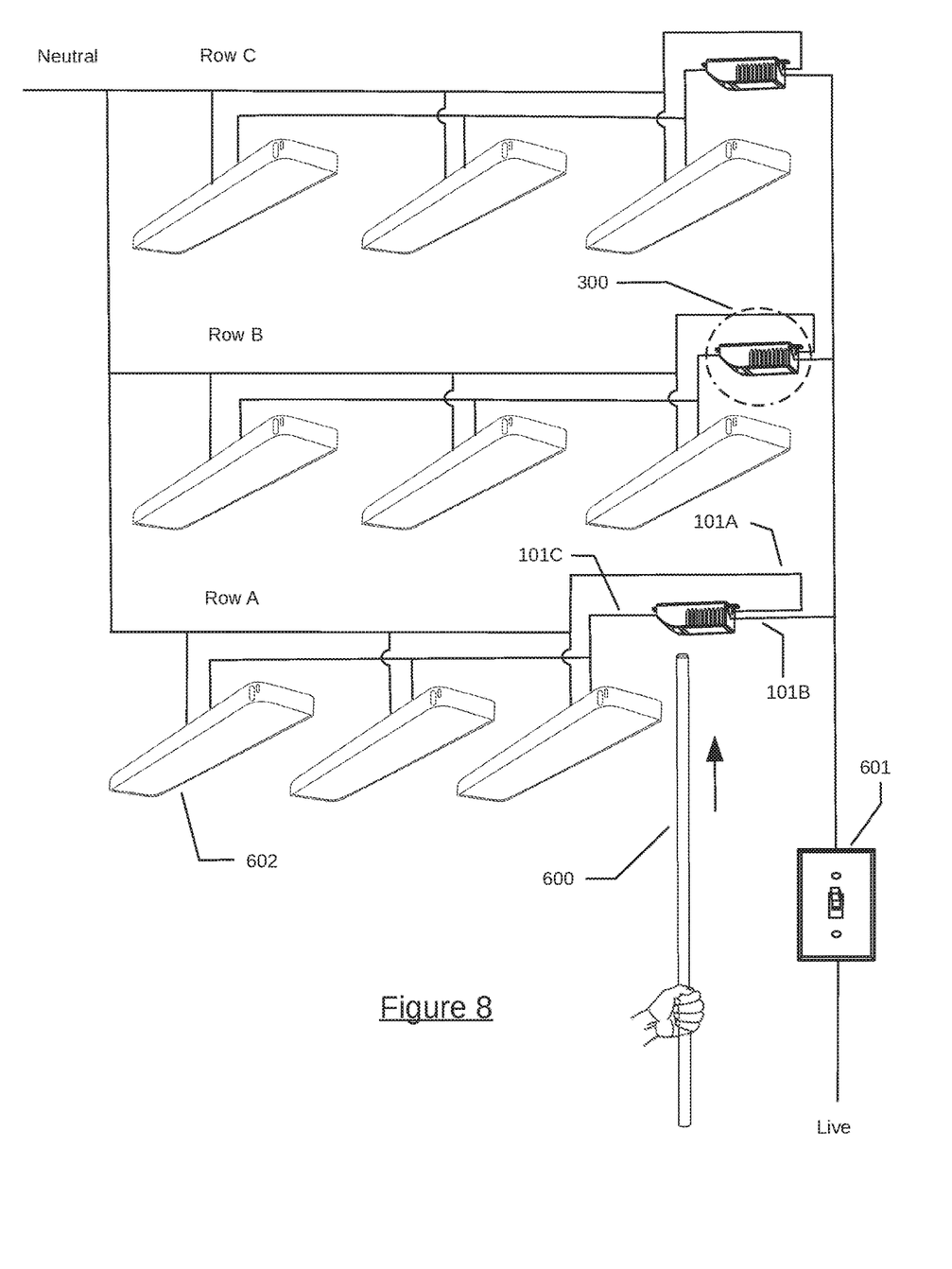
FIG. 8 shows how to initiate configuration mode of the present invention, by using a handheld pole after installation for pairing lights and time selection for group of lightings from the same circuit in an office area without the need of ladder or tools or computer or mobile devices.

FIG. 8 shows an installation of the invention as a wireless control system for smart lighting for groups of lightings from the same circuit in an office area. As the invention is installed to groups of lights, thus these lights can now be controlled in groups even though all of them are connected to the same circuit.

Comparing to FIGS. 6, 7 and 8, the only difference for FIG. 5 is that the pairing and time setting were done before installation. As long as Live wire and Neutral wire are connected to 101A and 101B, this invention 300 can be pre-paired and timer preset (or use factory default) before installation. Pre-installation pairing and setting are very convenient especially with big quantity installation. A group name or a color code can be given to each group that are paired together. For easy control, an X, Y and Z coordinates can also be given. A simple way is to write these information on a small sticker and stick it on the present invention for easy identification during installation. An example of using a green sticker and coordinate of X=1 and Y=5.

Figure 9:
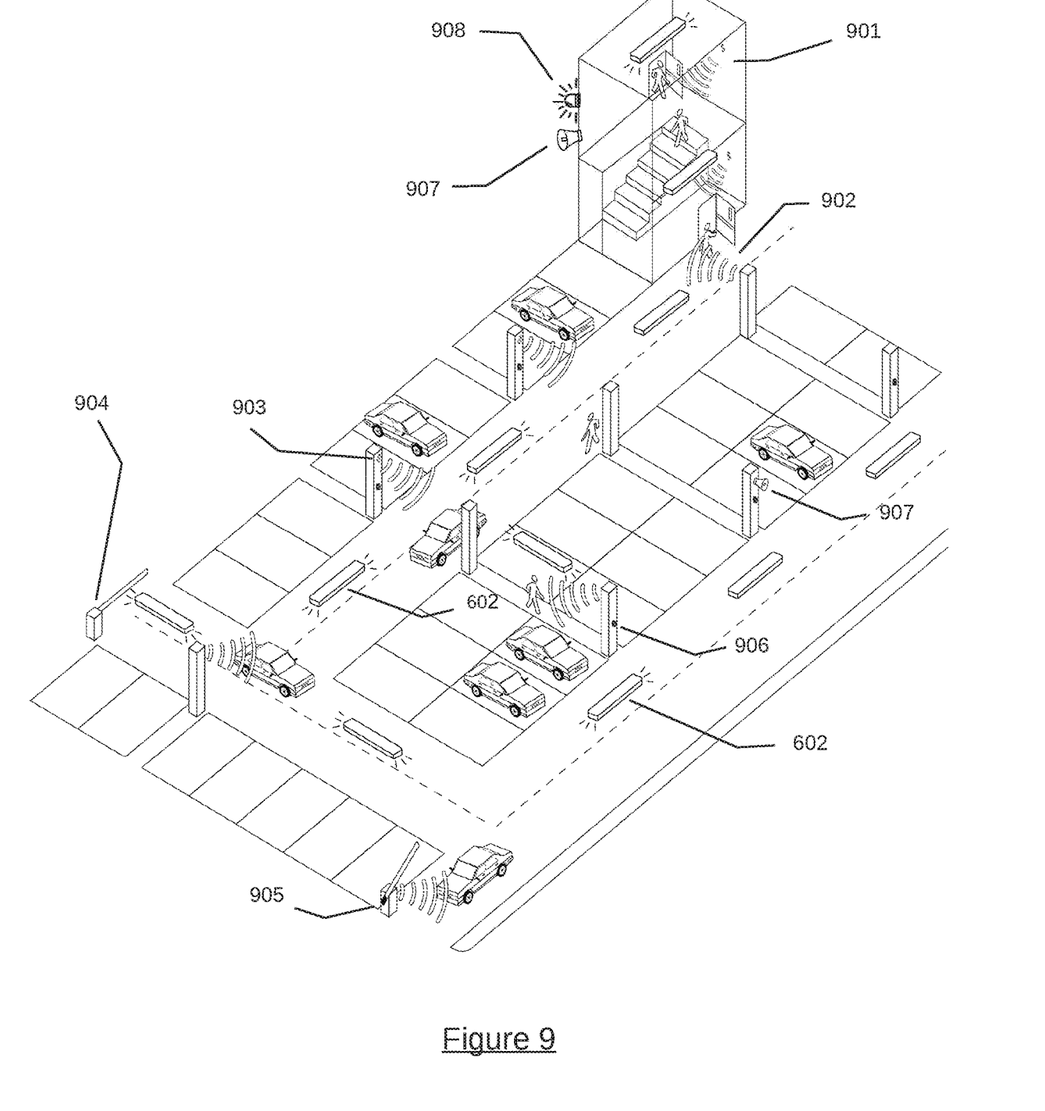
FIG. 9 show a more complex installation of the invention as an automated smart lighting system, access control and automation at a parking area.

Green color sticker (group information)
with X=1 (floor), and location Y=5 and Z=8 written on it FIG. 9. shows an advanced installation of the invention in a car park in a commercial building. The inventions work as a hive controlling car park lighting, access control, safety/security monitoring and automation at a parking area. Thus, shows the flexibility, modularity, and functionality of the invention.

901 turn ON the staircase lights when it detects people opening the door on the 1st floor. While 902 turns ON the lights and opens the door to the staircase area after it detects a person coming towards the door and about to leave the carpark. 602 lighting keeps the car park area lighted when 903 detects activities and movements in its vicinity, indicating cars moving in the area. 904 is on standby ready to open the entrance barrier pole if a car is detected moving towards it. 905 just open the barrier pole to let a car exit the car park area.

906 is an emergency panic button—a mechanical push button is used in place of the 110 sensor in this invention. When this mechanical button is pushed, it will request all its workers devices to sound the emergency siren 907, turn ON the siren light 908, turn ON all 602 lightings, notify the security room that an emergency is happening in the car park, stop the parking barrier pole 905 from opening and other necessary steps to lock down the parking facilities.

The foregoing description of the preferred embodiments of the invention have been presented for the purpose of disclosure. It is not intended to be exhaustive or to limit the invention and descriptions. It is not intended to be exhaustive or to limit the invention to the precise form disclosed. In light of the above teachings, many modifications and variations are possible and readily apparent to those skilled in the art. It is intended that the scope of the invention be limited not with these descriptions, but rather by the claims appended hereto.

What is claimed is:

1. A wireless automation system comprising:
    a plurality of devices;
    wherein the plurality of devices forms a hive; and
    wherein each device in the plurality of devices comprises:
        a wireless transceiver; wherein the wireless transceiver also includes a means to intercommunicate wirelessly with any of the plurality of devices within the hive in said system;
        a microprocessor to process data from at least one input element to generate output for performing actions;
        a first means for operation without needing to transmit or receive a request, wherein each device within the plurality of devices is able to operate standalone or connected to at least one third-party device;
        a second means for initiating a transmission request to other devices within the plurality of devices, wherein the transmission request includes requests for the other devices within the plurality of devices to perform an action or a plurality of actions as specified in the transmission request; and
        a third means for receiving the transmission request from a transmitting device within the plurality of devices and performing at least an action or plurality of actions as requested by the transmitting device.

2. The system according to claim 1, wherein each device in the plurality of devices further comprises a fourth means to forward the transmission request from the transmitting device to at least one other device in the plurality of devices.

3. The system according to claim 1, wherein the plurality of devices uses a Hive Identification Number (HIN) and a Frequency Channel (FC) for the plurality of devices to intercommunicate within the hive.

4. The system according to claim 1, wherein each device in the plurality of devices further comprises a button or a plurality of buttons, wherein manipulating the button or plurality of buttons can cause action selected from the group consisting of: a manipulated device to pair with at least one other device in the plurality of devices within the hive; to turn On or to turn Off at least one third-party device connected to the manipulated device; and to set a timer on the manipulated device to control the at least one third-party device.

5. The system according to claim 4, wherein the button or plurality of buttons comprises a pairing button and an on/off toggle button.

6. The system according to claim 4, wherein the manipulated device can initiate a pairing request and will become a master device upon successfully pairing with at least one receiving device within the plurality of devices that accepts the pairing request.

7. The system according to claim 6, wherein the at least one receiving device within the plurality of devices that accept the pairing request will become a worker device.

8. The system according to claim 7, wherein a master device can be paired with more than one worker device, and a worker device can be paired with more than one master device; and wherein a first master device can be paired with a second master device wherein the second master device becomes a worker device to the first master device.

9. The system according to claim 8, wherein each device in the plurality of devices further comprises a memory storage, wherein the number of devices that can be paired at one time is limited by the memory storage.

10. The system according to claim 7, further comprising a selectable Auto Reverse Pairing Mode (ARPM) wherein after the master device has successfully paired with the worker device, the worker device will reciprocate and reverse pair with the master device, and the worker device will become a reverse paired master device and the master device will become a reverse paired worker device.

11. The system according to claim 1, wherein each device in the plurality of devices further comprises a controlled switched that can select between Alternate Current (AC) or Direct Current (DC) to output to L1 for power output control or Boolean selection of third-party devices.

12. The system according to claim 11, further comprising:
- a means to use the controlled switch to select AC for power output of L1 for power management control of a connected third-party device that is interposed with said system to turn On or to turn OFF or a combination of both with time interposed in between said On and said Off sequence;
- a means to use the controlled switch to select DC for power output of L1 for power management control of third-party devices that is interposed with said system to turn On or to turn OFF or a combination of both with time interposed in between said On and said Off sequence; and
- a means to use the controlled switch to control DC power output of L1 as boolean logic of '0' or '1' to enable selection of third-party devices that is interposed with said invention.

13. The system according to claim 7, wherein the master device can control by proxy the worker device and allow the master device to request the worker device to take prescribed action on the master device's behalf.

14. The system according to claim 1, further comprising:
- an edge computing device, wherein the edge computing device can be a computer or a mobile device that is equipped with a wireless transceiver, with a Hive Identification Number (HIN) and a Frequency Channel (FC) to communicate with the plurality of devices in the hive.

15. The system according to claim 14, wherein using said edge computing device to do a mass pairing comprises:
- means to do the mass pairing using a 3-dimensional coordinate of X, Y and Z referring to location information that is referenced to a predefined location of 0,0,0; and
- means for a fourth coordinate that is referenced to a group number.

16. The system according to claim 14, further comprising remote connectivity capabilities including:
- means to connect to at least one remote computing devices that are not part of the hive; and
- means to forward data remotely to another site for further processing, sharing or storage purposes.

17. A method for hive communication comprising:
- using a common Hive Identification Number (HIN) and a Frequency Channel (FC) for intercommunicating within a hive;
- providing a plurality of devices wherein each device in the plurality of devices is assigned a Device Identification Number (DIN) within the hive;
- pairing of the plurality of devices wherein any device in the hive that initiates a pairing request becomes a master device and devices in the hive that accept the pairing request become worker devices; and
- wherein any device in the hive can initiate pairing multiple times and be a master device to many worker devices and can also accept multiple pairing requests to be a worker device to many master devices.

18. The method of claim 17, wherein providing a plurality of devices also includes providing a means for the worker devices to store a list of Device Identification Numbers (DIN) that the worker device has accepted as a master device during a pairing request, and operable to carry out an action or a plurality of actions as instructed in the received pairing request if the DIN in the received pairing request is listed in the list of DIN.

19. The method of claim 17, wherein any device can receive a request from the master device in a group and to forward the request to other devices within the hive.

20. The method of claim 17, wherein the hive can have multiple groups wherein each group has a master device and at least one worker device, where the at least one worker device or plurality of worker devices include means to couple to any other groups within the hive, either as a master device of another group or as a worker device to another master device in another group.

* * * * *